T. HAND.
NUT LOCK.
APPLICATION FILED APR. 14, 1908. RENEWED SEPT. 8, 1909.
938,320.
Patented Oct. 26, 1909.
Fig. 1.
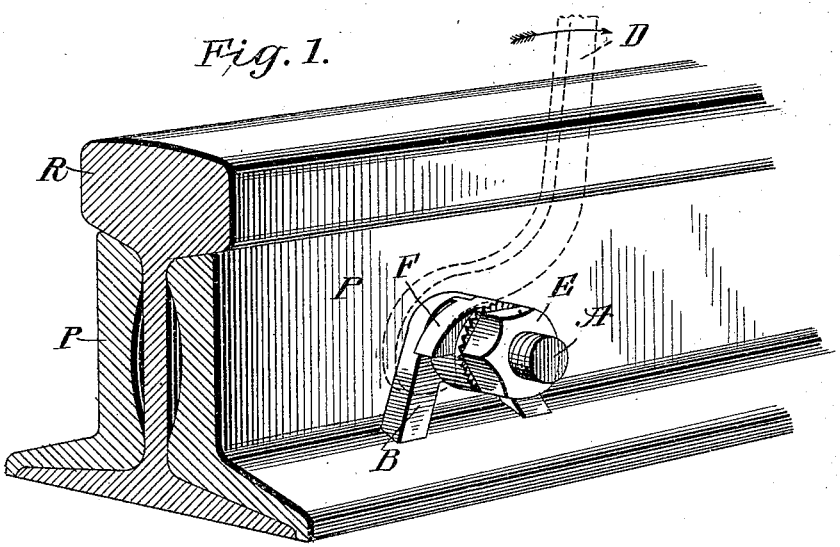
Fig. 4.
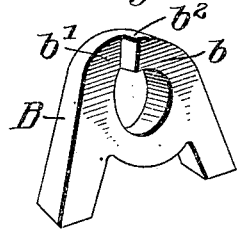
Fig. 2.
Fig. 6.
Fig. 5.
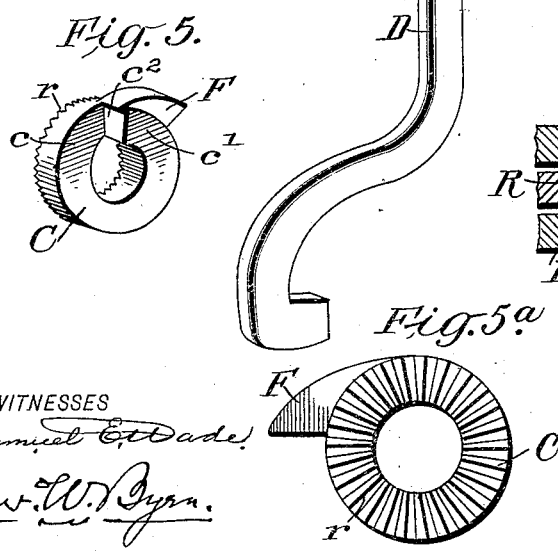
Fig. 3
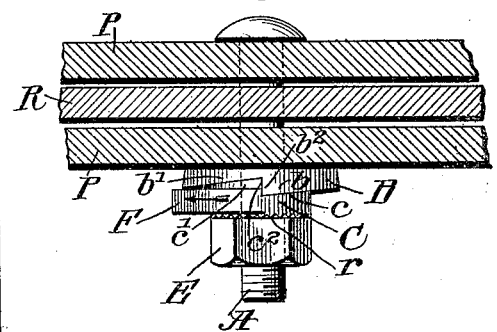
Fig. 5ᵃ
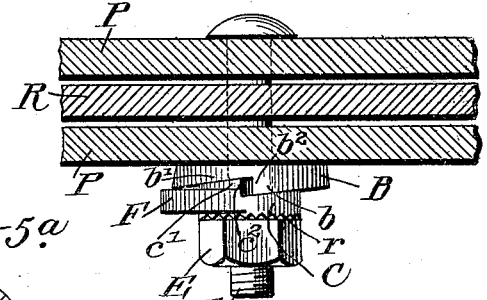
WITNESSES
Samuel E. Dade
Edw. W. Byrn.
INVENTOR
TOWNSON HAND
BY Munn & Co.
ATTORNEYS

UNITED STATES PATENT OFFICE.

TOWNSON HAND, OF WALLA WALLA, WASHINGTON.

NUT-LOCK.

938,320.  Specification of Letters Patent.  Patented Oct. 26, 1909.

Application filed April 14, 1908, Serial No. 426,986. Renewed September 8, 1909. Serial No. 516,795.

*To all whom it may concern:*

Be it known that I, TOWNSON HAND, a citizen of the United States, and a resident of Walla Walla, in the county of Walla Walla and State of Washington, have made certain new and useful Improvements in Nut-Locks, of which the following is a specification.

My invention is in the nature of an improved nut lock operating to some extent on the same principle as the nut lock heretofore patented by me, bearing date April 21, 1908, No. 885,614, but designed to provide a more simple, economical and strong device for the purpose.

It consists in the novel construction and arrangement of parts hereinafter described and claimed.

In the drawing—Figure 1 is a perspective view of my nut lock shown applied to the bolt connecting the fish plates of railroad rails. Figs. 2 and 3 are horizontal sections taken through the rail showing in plan view two positions of my nut lock. Figs. 4 and 5 are perspective views of the adjacent faces of the two locking washers constituting my nut lock. Fig. 5$^a$ is an enlarged face view of the locking washer shown in Fig. 5, and Fig. 6 is a detail view of a form of wrench or spanner employed for releasing my nut lock.

In the drawing A represents the bolt and E the nut of usual construction, for fastening together the two fish plates on opposite sides of a railroad rail. Between the nut E and one of the fish plates are arranged the two locking washers shown in Figs. 4 and 5, which together coöperate to lock the nut E on the bolt. The washer B, which is next to the fish plate, is provided with two divergent legs which rest upon the base of the fish plate so as to prevent said washer from turning. The outer face of this washer is formed around the bolt hole with a spiral cam face $b, b'$. The cam face $b$ swings gradually into the plate of the cam face $b'$ as it passes around the central axis, forming at $b^2$ an offsetting shoulder. In like manner the inner face of the washer C is provided with a spiral cam face $c, c'$ corresponding in pitch to the pitch of the cam face $b, b'$ of the washer B. The cam face $c, c'$ is also provided with the shoulder $c^2$, which corresponds to the shoulder $b^2$ of the washer B. The outer face of the washer C is provided with a series of serrations or ratchet teeth $r$ extending entirely around the bolt hole. On one side of this washer C is formed integrally therewith a projecting lug F, one of whose faces is radial, or so arranged as to accommodate locking engagement with the spanner wrench shown in Fig. 6.

In applying my lock nut to the bolt, the inner locking washer B is slipped over the bolt up to contact with the fish plate with its two downwardly projecting legs resting upon the base of said plate so that rotary motion of said locking washer is prevented. The outer locking washer C is then slipped up to engagement with the washer B, with their cam faces in contact as shown in Fig. 2, and with the shoulder $c^2$ of the washer C in contact with the shoulder $b^2$ of the washer B. The nut E is then turned upon the bolt A until the inner face of said nut engages the ratchet teeth $r$ of the outer locking washer. As the shoulder $c^2$ is resting against the shoulder $b^2$, it will be seen that this turning on movement of the nut E makes no turning movement of the washer C and the nut E may therefore be screwed up to tight engagement with the stationary teeth of the washer C. Now in any back turning movement of the nut E it will be seen that its clutch engagement with the teeth $r$ of washer C will have a tendency to cause said washer to turn with the nut in the direction of the arrow shown in Fig. 2, but as this washer can only turn in the direction of said arrow by having its cam faces ride up and outwardly upon the cam faces of the washer B, this movement is precluded. The position of the lug F on the washer C is such in relation to the cam faces that when the cam faces are engaged as in Fig. 2, the lug F projects to the left in nearly horizontal position. This causes the washer C to be continually out of balance with a larger weight on the left hand side than it has on the right, which has a tendency to cause the washer C to move from gravity in the direction of the arrow in Fig. 2. The purpose of this is to take up automatically any looseness in the cam faces, which may occur from the repeated hammering action of the passage of trains, so that if such looseness exists the gravity effect of the weighted lug F will cause the washer C to turn slightly, causing its cam faces to ride outwardly upon the cam faces of the washer B and thus take up such looseness, as seen in Fig. 3. Another function of the lug F is to facilitate the disengagement of the nut lock when it is desired to remove the bolt. For this purpose the spanner wrench D is applied to the nut lock as shown in dotted lines in Fig. 1, with the hook of the wrench engaging the radial side of the lug F. Now by straining the wrench D in the direction of the arrow in Fig. 1, it will be seen that a slight initial movement of the washer C is given, which causes its cam faces to move inwardly on the inclined cam faces of the washer B and away from contact with the nut E, so that the unscrewing movement of the nut E will not carry with it the washer C and consequently will not produce any jamming effect upon the two cam faces of the locking washers.

In pointing out the distinctive advantages of this form of nut lock, I will state that it is much stronger, more rapidly applied and removed and may be manufactured at a much less cost on account of its simplicity, there are no key holes or cavities to become clogged, it automatically adjusts itself to a constantly tightening position and may be removed by simply exerting a holding strain on the lug F by a crow-bar, pick, or other tool, if the wrench D should not be available.

The device is very simple and cheap as it may be struck up by drop forging.

I claim—

1. A nut lock comprising two continuous locking washers, one of them being formed with downwardly projecting bearings to prevent rotation and with a central perforation surrounded by a spiral cam face interrupted by an intersecting shoulder, and the other being formed with a corresponding spiral cam face having an intersecting stop shoulder, and a radially projecting and weighty lug on the side of the washer which tightens the cam faces.

2. A nut lock comprising two continuous locking washers, one of them being formed with downwardly projecting bearings to prevent rotation and with a central perforation surrounded by a spiral cam face interrupted by an intersecting shoulder, and the other being formed with a corresponding spiral cam face having an intersecting shoulder, and a radially projecting and weighty lug on the side of the washer which tightens the cam faces, and clutch faces on the outer side of said washer adapted to be engaged by the nut.

3. The combination with the rail, fish plates and a bolt and nut; of a locking device consisting of two continuous locking washers having correspondingly inclined cam faces, the outer one of said washers being also provided with a radially projecting lug to tighten the cam faces from gravity and also to form a hold for restraining its turning movement when removing the nut.

TOWNSON HAND.

Witnesses:
E. D. MATTINSON,
HARRY HAND.